United States Patent
Wilson et al.

(10) Patent No.: US 9,552,553 B1
(45) Date of Patent: Jan. 24, 2017

(54) IDENTIFYING ITEM PREPARATION REQUIREMENTS

(71) Applicant: Amazon Technologies, Inc., Reno, NV (US)

(72) Inventors: Darren Edward Wilson, Lynnwood, WA (US); Aleksandr Mikhaylovich Ingerman, Seattle, WA (US); Aaron Hyrum Smith, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 183 days.

(21) Appl. No.: 13/926,565

(22) Filed: Jun. 25, 2013

(51) Int. Cl.
*G06E 1/00* (2006.01)
*G06E 3/00* (2006.01)
*G06F 15/18* (2006.01)
*G06G 7/00* (2006.01)
*G06N 99/00* (2010.01)

(52) U.S. Cl.
CPC .................................. *G06N 99/005* (2013.01)

(58) Field of Classification Search
CPC ......... G01B 21/00; G01B 21/08; G01N 33/00; G01N 9/36; G06E 1/00; G06E 3/00; G06F 15/18; G06G 7/00; G06Q 10/08

USPC ............................................................ 706/19
See application file for complete search history.

(56) References Cited

U.S. PATENT DOCUMENTS

| | | | |
|---|---|---|---|
| 7,050,938 B1 * | 5/2006 | Prater et al. ................... | 702/182 |
| 8,296,101 B1 * | 10/2012 | Barlow et al. ................ | 702/182 |
| 8,401,975 B1 * | 3/2013 | Tian ...................... | G06Q 10/08 705/330 |
| 2008/0133317 A1 * | 6/2008 | Benson et al. .................. | 705/10 |
| 2009/0265179 A1 * | 10/2009 | Cunniff .................. | G06Q 10/08 705/1.1 |
| 2010/0049537 A1 * | 2/2010 | Erie .......................... | B65B 5/00 705/1.1 |

* cited by examiner

*Primary Examiner* — Stanley K Hill
*Assistant Examiner* — Peter Coughlan
(74) *Attorney, Agent, or Firm* — Thomas | Horstemeyer, LLP (57) ABSTRACT

Disclosed are various embodiments for an item preparation application. Business logic and machine learning may be applied to attributes of an item to generate a recommendation for item preparation prior to storage in a physical storage facility. The recommendation may indicate whether preparation is to be applied, or what type of preparation is required. A machine learning knowledge base may be updated based on feedback or overrides of recommendations.

20 Claims, 4 Drawing Sheets

IDENTIFYING ITEM PREPARATION REQUIREMENTS

BACKGROUND

Items may require different packaging preparations prior to storage. Packaging preparations may vary based on the durability of an item, a tendency for the item to accumulate dirt or debris, or other factors. Additionally, similar items purchased from differing vendors may arrive with differing forms of packaging. Manually determining how to prepare an item is labor intensive and time consuming.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to recommending preparations for items in an automated manner before the items are placed in storage locations. Commercial enterprises such as those used in conjunction with an electronic commerce system often maintain a warehouse, a fulfillment center, a materials handling facility, or other physical storage facility to store items before the items are picked for shipment to a customer. Various types of items may require preparation prior to storage in such a facility. Such preparations may include bagging, wrapping, boxing, and/or other types of protective packaging to be applied to the items. The specific type of preparation that is recommended may depend on the characteristics or attributes of the item. For example, a plush toy or clothing may require wrapping or placement in a bag to prevent the accumulation of dirt or debris. As another example, fragile items such as dishware may require placement in sturdy or secure packaging or wrapping in impact-resistant material to reduce the risk of damage. Books or other durable items may require no preparation prior to storage. As will be described herein, item preparation recommendations may be automatically generated based upon business logic and/or machine learning relative to one or more knowledge bases. Manual classifications may be employed to create rules used by the business logic and/or improve classifications automatically generated using machine learning.

To further illustrate, the preparation required for an item may vary depending on whether packaging was applied to the item prior to arrival at the storage facility. For example, a manufacturer may include packaging for an item. Vendors of the items may also apply packaging to the items. Different vendors who sell similar or identical items may vary in their packaging practices, such that two identical items may require different additional packaging prior to being stored. The preparation required for an item prior to storage can be manually determined at the storage facility. For example, an employee can evaluate an item and recommend packaging based on personal judgment, a predefined checklist of item criteria, or other approaches. This is time consuming, requires dedicated labor, and is open to personal error. Various implementations of the present disclosure provide automated approaches to creating item preparation recommendations that minimize manual determinations.

To this end, an item preparation application can automatically generate a recommendation for item preparations to be applied to an item prior to storage. This may include using business logic to apply a rule set to attributes of the item. This may also include applying a machine learning approach to a knowledge base of recommendations and the item attributes to determine what preparation is required, if any. The machine learning approach may also be applied to one of many knowledge bases, depending on attributes of the item. The business logic or machine learning approach may also be used to determine packaging requirements for the item prior to shipping. In the following discussion, a general description of the system and its components is provided, followed by a discussion of the operation of the same.

Figure 1:
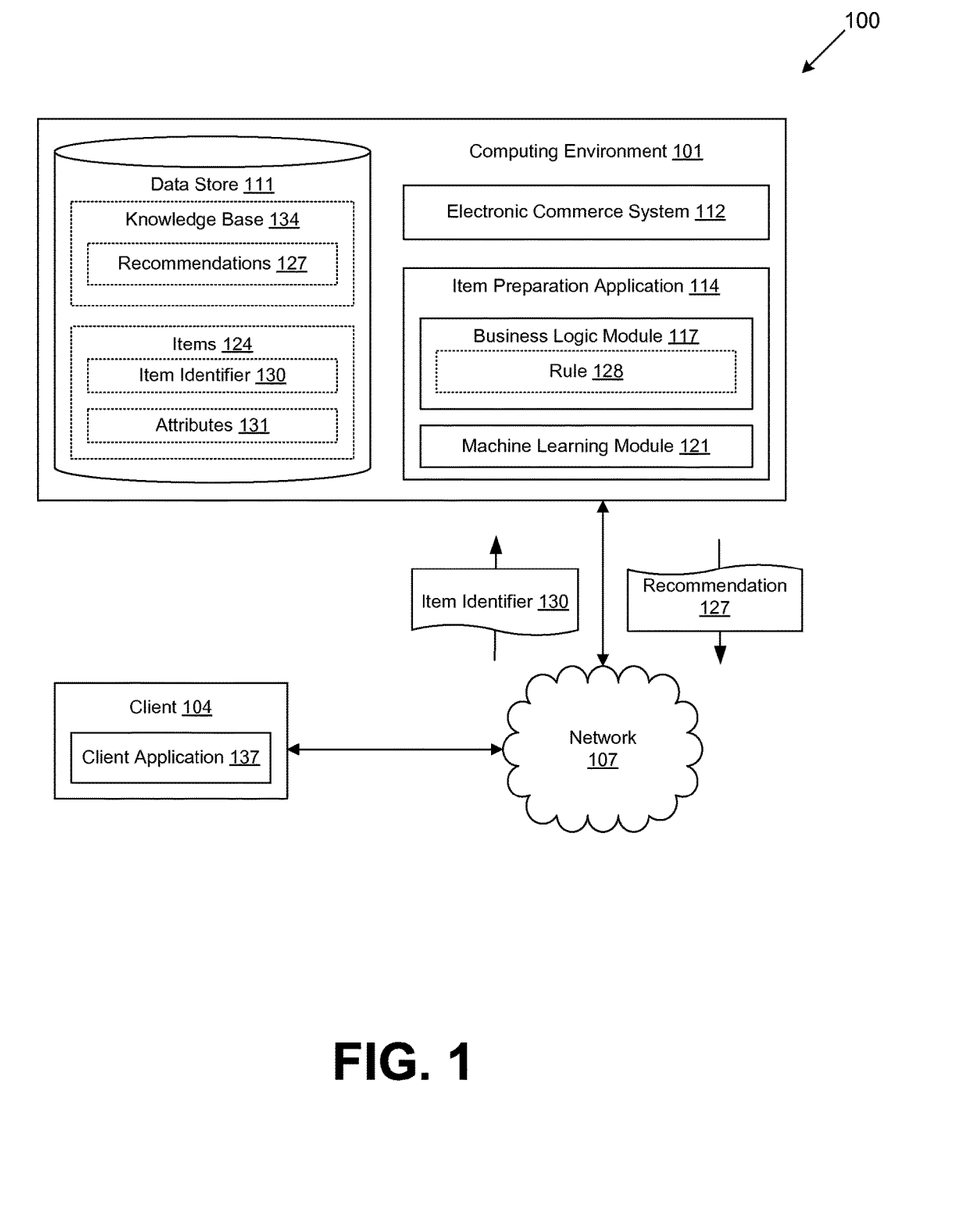
FIG. 1 is a drawing of a networked environment according to various embodiments of the present disclosure.

With reference to FIG. 1, shown is a networked environment 100 according to various embodiments. The networked environment 100 includes a computing environment 101 and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below. The components executed on the computing environment 101, for example, include an electronic commerce system 112, an item preparation application 114 having a business logic module 117 and a machine learning module 121, and other applications, services, processes, systems, engines, or functionality not discussed in detail herein. The electronic commerce system 112 is executed in order to facilitate the online purchase of items 124 over the network 107. The electronic commerce system 112 also performs various backend functions associated with the online presence of a merchant in order to facilitate the online purchase of items 124 as will be described. For example, the electronic commerce system 112 generates network pages such as web pages or other types of network content that are provided to clients 104 for the purposes of selecting items for purchase, rental, lease, or other form of consumption as will be described.

The item preparation application 114 is executed to generate a recommendation 127 indicating what preparation, if any, should be applied to an item 124 prior to storing the item 124 in a warehouse, distribution center, or other storage area. Items 124 are representative of goods or products available for purchase, rental, lease, or other consumption via the electronic commerce system 112. Recommendations 127 indicate whether a corresponding item 124 requires packaging or other preparation prior to being stored in a storage facility. Additionally, recommendations 127 may indicate a type of packaging or preparation to be applied to the corresponding item 124. For example, the recommendation 127 may indicate that the item 124 should be wrapped in an impact resistant or protective material, bagged, boxed, or otherwise prepared. Recommendations 127 may also indicate other actions to be taken with respect to the item 124. For example, the recommendation 127 may indicate that a manual review or inspection of the item 124 should be performed to determine if a preparation is required, what type of preparation may be required, or other information.

Although the item preparation application 114 is discussed in the context of generating a recommendation 127 for preparation applied to an item 124 prior to storage, it is understood that the functionality of the item preparation application 114 may also be applied to generate a recommendation 127 for preparation applied to an item 124 prior to shipment, or another action.

To this end, the item preparation application 114 implements a business logic module 117 to apply one or more rules 128 to an item identifier 130, attributes 131 of an item 124, and potentially other data. A recommendation 127 may then be generated based at least in part on the rules 128 which are satisfied by the attributes 131 of the item 124. An item identifier 130 may comprise any identifier to distinguish a corresponding item 124. This may comprise, for example, a Universal Product Code (UPC), a title or name of an item 124, a text, numeric, or alphanumeric identifier, or other identifiers as can be appreciated.

Attributes 131 may comprise, for example, physical attributes 131 of an item 124, such as size, weight, or other physical attribute 131. Attributes 131 may also comprise catalog data facilitating a listing or sale of a corresponding item 124 via the electronic commerce system 112. These may include, for example, catalog descriptions, prices, or other attributes 131. In embodiments in which items 124 are organized into a taxonomy or other classification by the electronic commerce system 112, attributes 131 may include item categories, item sub-categories, or other classifications applied to the item 124. Attributes 131 may also comprise other data.

The machine learning module 121 applies a machine learning approach to item attributes 131, a knowledge base 134, and potentially other data to facilitate generating a recommendation 127 for an item 124. The knowledge base 134 comprises data indicating previously generated recommendations 127. The recommendations 127 embodied in the knowledge base 134 may comprise recommendations 127 previously generated by the item preparation application 114, manually generated by a client 104, or generated by another approach. The previously generated recommendations 127 may be associated in the knowledge base 134 with corresponding items 124, attributes 131, or other data. The knowledge base 134 may also comprise manually made decisions regarding the preparation of an item 124. The knowledge base 134 may be embodied as a support vector machine, Bayesian model, regression model, neural network, or other machine learning model as can be appreciated.

The data stored in the data store 111 includes, for example, items 124 having item identifiers 130 and attributes 131, one or more knowledge bases 134 associated with previously generated recommendations 127, and potentially other data.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 137 and/or other applications. The client application 137 may be executed in a client 104, for example, to access network content served up by the computing environment 101 and/or other servers. To this end, the client application 137 may comprise, for example, a browser, a dedicated application, etc. The client 104 may be configured to execute applications beyond the client application 137 such as, for example, email applications, social networking applications, word processors, spreadsheets, and/or other applications.

Next, a general description of the operation of the various components of the networked environment 100 is provided. To begin, the client 104 communicates an item identifier 130 indicative of an item 124 to be stored to the item preparation application 114 via the network 107. This may comprise, for example, communicating a UPC, product identification, title, or other item identifier 130 to the item preparation application 114. The item identifier 130 may be manually input by a user of the client 104, obtained from a barcode, Quick Response (QR) code, or other visual embodiment of an item identifier 130, or obtained by the client 104 by another approach.

After obtaining the item identifier 130 from the client 104, the item preparation application 114 generates a recommendation 127 indicating whether the item 124 requires preparation, a type of preparation, or potentially other data. In some embodiments, this may comprise the business logic module 117 applying one or more rules 128 to the item identifier 130, item attributes 131, or other data. The recommendation 127 may then be generated as a function of satisfied rules 128.

Rules 128 may define what form of item preparation is to be applied to an item 124 in a given situation. In one embodiment, a rule 128 may be a function that takes one or more parameters describing the situation as input, and outputs a result corresponding to the recommendation 127. A parameter or combination of parameters may be said to "satisfy" a rule 128 when a rule 128 is configured to provide a recommendation 127 for particular values for the parameter or combination of parameters. The business logic module 117 may apply rules 128 to the item identifier 130. For example, a rule 128 may indicate that an item identifier 130 is associated with a particular recommendation 127 that has already been generated. As another example, a rule 128 may indicate that an item identifier 130 has particular manually defined preparation instructions. The business logic module 117 may also apply rules 128 to the item identifier 130 by another approach.

The business logic module 117 may also apply rules 128 to the attributes 131 of the item 124 rather than the item identifier 130. Attributes 131 may be obtained from a catalog or other data accessible to an electronic commerce system 112. Attributes 131 may also be obtained from a data store 111, or by another approach. In some embodiments, rules 128 may be applied to physical characteristics of the item 124 indicated in the attributes 131, such as a size, weight, or other physical characteristics. For example, large items 124 such as those with a size meeting or exceeding a threshold may automatically require no packaging or preparation. Rules 128 may also be applied to materials or other components of an item 124 indicated in the attributes 131. For example, items 124 made of metal or paper may require no packaging, while items 124 made of glass may require padding or protective packaging. The business logic module 117 may then generate a recommendation 127 for the appropriate type of packaging.

The business logic module 117 may apply rules 128 to information associated with a facility at which an item 124 will be stored. For example, rules 128 may vary in what preparation is recommended based on where an item 124 will be stored, such as in a box, on a shelf, in a pile or stack, or by another approach. Rules 128 may also vary in what preparation is recommended based on how the items 124 will be handled. For example, different preparation may be required depending on whether the items 124 will be handled by humans, robots, or other entities.

The business logic module 117 may also apply rules 128 to attributes 131 obtained from a catalog or other data structure to facilitate the sale of items 124 through the electronic commerce system 112 or another system. For example, the business logic module 117 may automatically recommend packaging for items 124 meeting or exceeding a purchase price defined by the electronic commerce system 112. In embodiments in which items 124 are organized into a taxonomy or other classification system in the electronic commerce system 112, the business logic module 117 may apply rules 128 to categories, sub-categories, or other classifications including the item 124. For example, a rule 128 may indicate that an item 124 organized into the "Books" category may require no packaging. A rule 128 may also indicate that an item 124 organized into the "Plush Toys" category may always require plastic bagging.

In some embodiments, the business logic module 117 may apply rules 128 to attributes 131 indicating supply chain or other business characteristics of the item 124. For example, a rule 128 may indicate that items 124 from a particular manufacturer always require packaging due to known quality or durability issues. Such quality or durability issues may be embodied in attributes 131 including composite materials, generated from customer returns, complaints, or reviews, indicated by manual input, or by another approach. As another example, a rule 128 may indicate that an item 124 normally requiring packaging is distributed from a vendor which prepackages items 124, and therefore requires no additional packaging. Rules 128 may also be applied to attributes 131 by other approaches.

The business logic module 117 may apply rules 128 to the item identifier 130, attributes 131, or other data sequentially. The rules 128 may be applied until a rule 128 is satisfied. The business logic module 117 may then generate a recommendation 127 corresponding to the satisfied rule. The rules 128 may also be applied until a predefined number of rules 128 have been satisfied, or until a predefined number of rules 128 have been applied. The business logic module 117 may then generate the recommendation 127 as a function of those of the rules 128 which have been satisfied. The business logic module 117 may also apply the rules 128 in an order defined by a decision tree, randomly, or by some other approach.

In some embodiments, the item preparation application 114 may query the machine learning module 121 to apply a machine learning approach to a knowledge base 134 to generate the recommendation 127. The machine learning module 121 may generate the recommendation 127 responsive to the business logic module 117 being unable to generate the recommendation 127. For example, if the business logic module 117 determines that the item 124 satisfies no rules 128 or satisfies rules 128 which are insufficient to generate a recommendation 127, the item preparation application 114 may then query the machine learning module 121 to generate the recommendation 127. The item preparation application 114 may also query the machine learning module 121 with output from the business logic module 117 such as a generated recommendation 127, satisfied or unsatisfied rules, or other output. The item preparation application 114 may also query the machine learning module 121 in the alternative to the business logic module 117. The item preparation application 114 may also query the machine learning module 121 by another approach.

The machine learning approach applied by the machine learning module 121 may comprise an unsupervised machine learning approach, supervised machine learning approach, semi-supervised machine learning approach, reinforcement machine learning approach, or other type of machine learning approach as can be appreciated. The machine learning module 121 may apply the machine learning approach to the item identifier 130, attributes, input from the client 104, and potentially other data in conjunction with the knowledge base 134 to generate the recommendation 127. In some embodiments, the machine learning module 121 may apply the machine learning approach to an output from the business logic module 117, such as an indication of rules 128 satisfied or unsatisfied by the item 124. The machine learning approach may also be applied to other data.

In some embodiments, the machine learning module 121 may first select one of multiple knowledge bases 134 for applying the machine learning approach. The particular knowledge base 134 may be selected from the multiple knowledge bases 134 as a function of attributes 131 such as an item 124 category or sub-category, as a function of input from the client 104, or as a function of other data.

In some embodiments, the machine learning module 121 may generate a confidence score indicative of a probability that a preparation should be applied to an item 124. The confidence score may indicate, for example, a probability that an item 124 requires any preparation, a probability that the item 124 requires a particular type of preparation, or another probability. In some embodiments, the machine learning module 121 may generate a recommendation 127 for a preparation responsive to a corresponding confidence score meeting or exceeding a predefined threshold. For example, the machine learning module 121 may generate a confidence score indicating a ninety-percent probability that an item 124 requires bagging. Responsive to the confidence score meeting or exceeding a threshold, the machine learning module 121 would then generate a recommendation 127 indicating that the item 124 should be bagged.

In some embodiments, the machine learning module 121 may generate multiple confidence scores corresponding to different actions to be indicated in a recommendation 127 for an item 124. In an embodiment, the machine learning module 121 may then generate a recommendation 127 indicating the action corresponding to the highest confidence score. In another embodiment, the machine learning module 121 may generate a recommendation 127 indicating the action corresponding to the highest confidence score which meets or exceeds a respective predefined threshold.

For example, the machine learning module 121 may generate a first confidence score indicating an eighty-percent probability that an item 124 requires shrink-wrapping, and a second confidence score indicating a sixty-percent probability that an item 124 requires manual inspection. In this example, the machine learning module 121 may require a confidence score indicating at least a ninety-percent probability to generate a recommendation 127 for shrink-wrapping, and may require a confidence score indicating at least a forty-percent probability to generate a recommendation 127 for manual review. The machine learning module 121 would then generate a recommendation 127 for manual review as the confidence score for shrink-wrapping was higher, but failed to meet or exceed the ninety-percent threshold.

In some embodiments, the machine learning module 121 may generate a default recommendation 127 responsive to none of the confidence scores meeting or exceeding a threshold. The default recommendation 127 may be a predefined default recommendation 127, defined as a function of user preferences, or by another approach. The machine learning module 121 may also generate recommendations 127 using confidence scores by another approach.

After generating the recommendation 127, the item preparation application 114 then communicates the recommendation 127 to the client 104. This may comprise, for example, encoding for rendering a user interface embodying the recommendation 127. The recommendation 127 may also be communicated by another approach.

In some embodiments, after generating the recommendation 127, the item preparation application 114 may update the knowledge base 134 with the generated recommendation 127. This may comprise, for example, including data in the knowledge base 134 indicating the recommendation 127, and the data from which the recommendation 127 was generated, such as item identifiers 130, attributes 131, input from the client 104, or other data.

After receiving the recommendation 127, a user of the client 104 may initiate a manual override of the recommendation 127. For example, if the recommendation 127 indicates that the item 124 should be packed in dry ice and the user of the client 104 believes that the item 124 requires no preparation, the user of the client 104 may then override the recommendation 127 to indicate that no preparation is required. In such an embodiment, the item preparation application 114 may update the entry in the knowledge base 134 corresponding to the overridden recommendation 127 with the action indicated in the manual override.

The item preparation application 114 may also modify a threshold for a confidence score responsive to a manual override by a user of a client 104. For example, a user of a client 104 may override a recommendation 127 indicating that an item should be shrink-wrapped with a recommendation 127 that an item should be bagged. The item preparation application 114 may then increase the confidence score threshold corresponding to shrink-wrapping. The item preparation application 114 may also decrease the confidence score threshold corresponding to bagging. Other actions may also be taken with respect to confidence score thresholds responsive to a manual override.

In some embodiments, after an item 124 is purchased via the electronic commerce system 112 and shipped to a customer, the customer may then request a replacement for the purchased item 124 or return the item 124 for a refund due to the item 124 arriving damaged. This may indicate that the recommendation 127 did not indicate an action adequate to prevent the item 124 being damaged during storage. In such an embodiment, the item preparation application 114 may modify confidence score thresholds or update the knowledge base 134 as was discussed above with respect to manual overrides. The confidence score thresholds or the knowledge base 134 may also be updated as a function of a customer review of a received item 124, or as a function of other data. For example, customer reviews may include keywords indicating that an item 124 arrived in a damaged condition. It may be determined that a more protective item preparation should be applied in the future for the item 124 and other items 124 embodying similar characteristics, and the confidence score thresholds and/or the knowledge base 134 may be updated to this effect. Conversely, customer reviews may indicate that an item 124 arrived with excessive packaging, which may be environmentally unfriendly or frustrating to open. Accordingly, a simplified item preparation should be applied in the future for the item 124 and other items 124 embodying similar characteristics, and the confidence score thresholds and/or the knowledge base 134 may be updated to this effect.

Figure 2A:
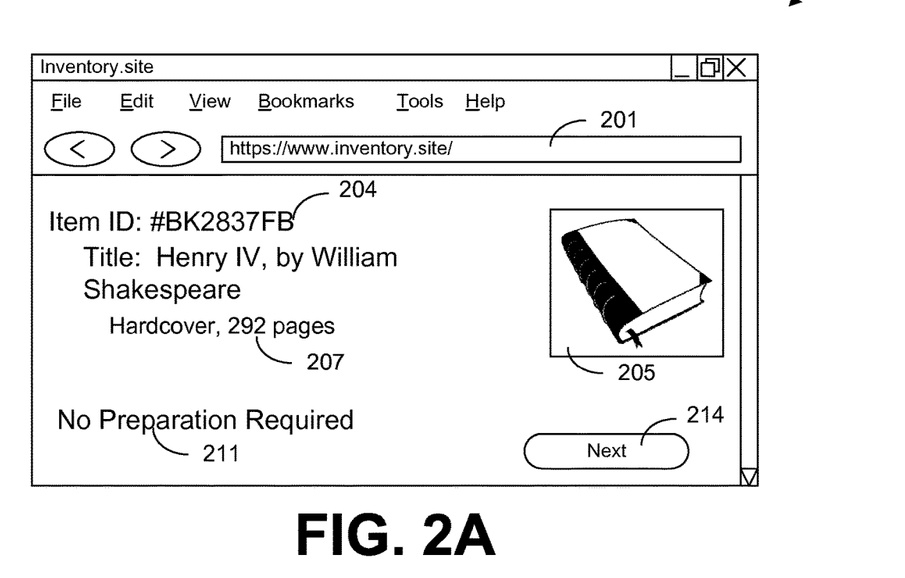
FIGS. 2A and 2B are drawings of example user interfaces rendered by a client in the networked environment of FIG. 1, according to various embodiments of the present disclosure.

Referring next to FIG. 2A, shown is an example user interface 200 generated by the item preparation application 114 (FIG. 1) to communicate a recommendation 127 (FIG. 1) for an item 124 (FIG. 1) to a client 104 (FIG. 1). In some embodiments, the user interface 200 may comprise a network page encoded for rendering by a browser client application 137 (FIG. 1) executed in the client 104. In other embodiments, the user interface 200 may comprise data encoded for rendering by a dedicated client application 137 executed in the client 104.

Element 201 is a Uniform Resource Locator (URL) directed to content generated by the item preparation application 114. Element 204 is a text representation of an alphanumeric item identifier 130 (FIG. 1). Element 205 is an image of an item 124 for which the recommendation 127 was generated. Element 207 is a description of the item 124 generated from attributes 131 (FIG. 1) of the item 124. Element 211 is an action indicated by the recommendation 127.

In this non-limiting example, the item 124 corresponds to a hardcover book titled "Henry IV" by William Shakespeare. The recommendation 127 indicates that no preparation is required for the item 124 prior to storage. In other words, no special bagging, bubble wrapping, boxing, or other type of preparation is recommended to be applied to the hardcover book before the book is stored in an inventory location in a materials handling facility. Rules 128 (FIG. 1) and/or the machine learning module 121 (FIG. 1) may have led the item preparation application 114 to conclude that hardcover books having a certain dimension or from a certain publisher have a sufficient durability not to need any type of preparation.

Element 214 is a button to proceed to a next task in a preparation workflow, such as a confirmation of the recommendation 127, an override of the recommendation 127, or another task. For example, in the next task, an agent may agree with the recommendation 127 and confirm the recommendation 127, the agent may manually override the recommendation 127 with a preparation alternative, or the agent may perform other actions. Consequently, one or more rules 128 may be created or modified, and the knowledge base 134 (FIG. 1) may be updated.

Figure 2B:
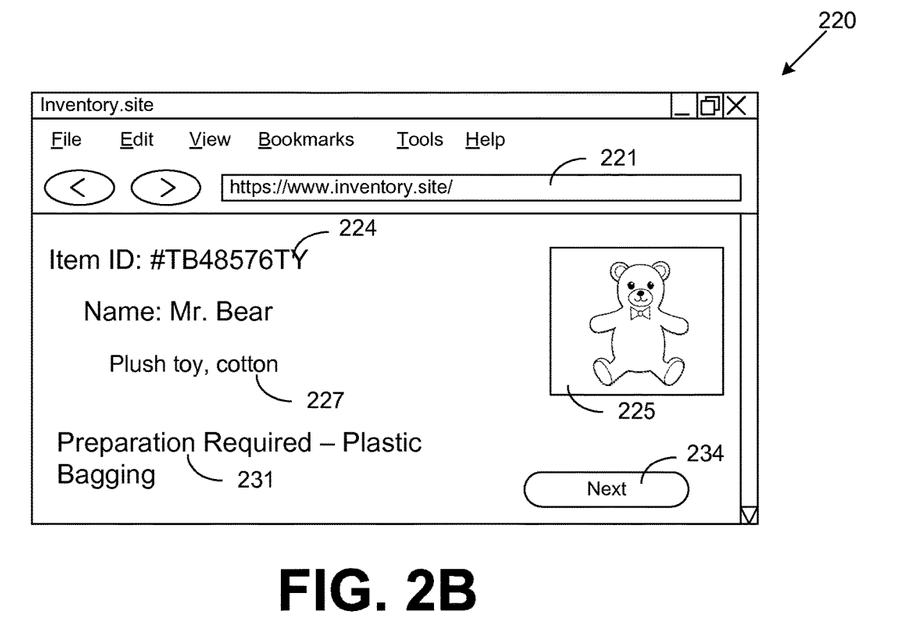

Turning now to FIG. 2B, shown is an example user interface 220 generated by the item preparation application 114 (FIG. 1) to communicate a recommendation 127 (FIG. 1) for an item 124 (FIG. 1) to a client 104 (FIG. 1). In some embodiments, the user interface 220 may comprise a network page encoded for rendering by a browser client application 137 (FIG. 1) executed in the client 104. In other embodiments, the user interface 220 may comprise data encoded for rendering by a dedicated client application 137 executed in the client 104.

Element 221 is a Uniform Resource Locator (URL) directed to content generated by the item preparation application 114. Element 224 is a text representation of an alphanumeric item identifier 130 (FIG. 1). Element 225 is an image of an item 124 for which the recommendation 127 was generated. Element 227 is a description of the item 124 generated from attributes 131 (FIG. 1) of the item 124. Element 231 is an action indicated by the recommendation 127.

In this non-limiting example, the item 124 corresponds to a plush toy, and the recommendation 127 indicates that the item 124 should be placed in a plastic bag prior to storage in an inventory location in a materials handling facility. Rules 128 (FIG. 1) and/or the machine learning module 121 (FIG. 1) may have led the item preparation application 114 to conclude that plush toys need protection (e.g., from dust, sunlight, moisture, etc.) in a particular materials handling facility. It may be that the recommended plastic bag has a sufficient opacity to prevent sunlight-caused fading and damage for fabrics used in the plush toy. However, a plush toy is not particularly fragile and may not warrant bubble wrapping or packing within a box prior to storage.

Element 234 is a button to proceed to a next task in a preparation workflow, such as a confirmation of the recommendation 127, an override of the recommendation 127, or another task. For example, in the next task, an agent may agree with the recommendation 127 and confirm the recommendation 127, the agent may manually override the recommendation 127 with a preparation alternative, or the agent may perform other actions. Consequently, one or more rules 128 may be created or modified, and the knowledge base 134 (FIG. 1) may be updated.

Figure 3:
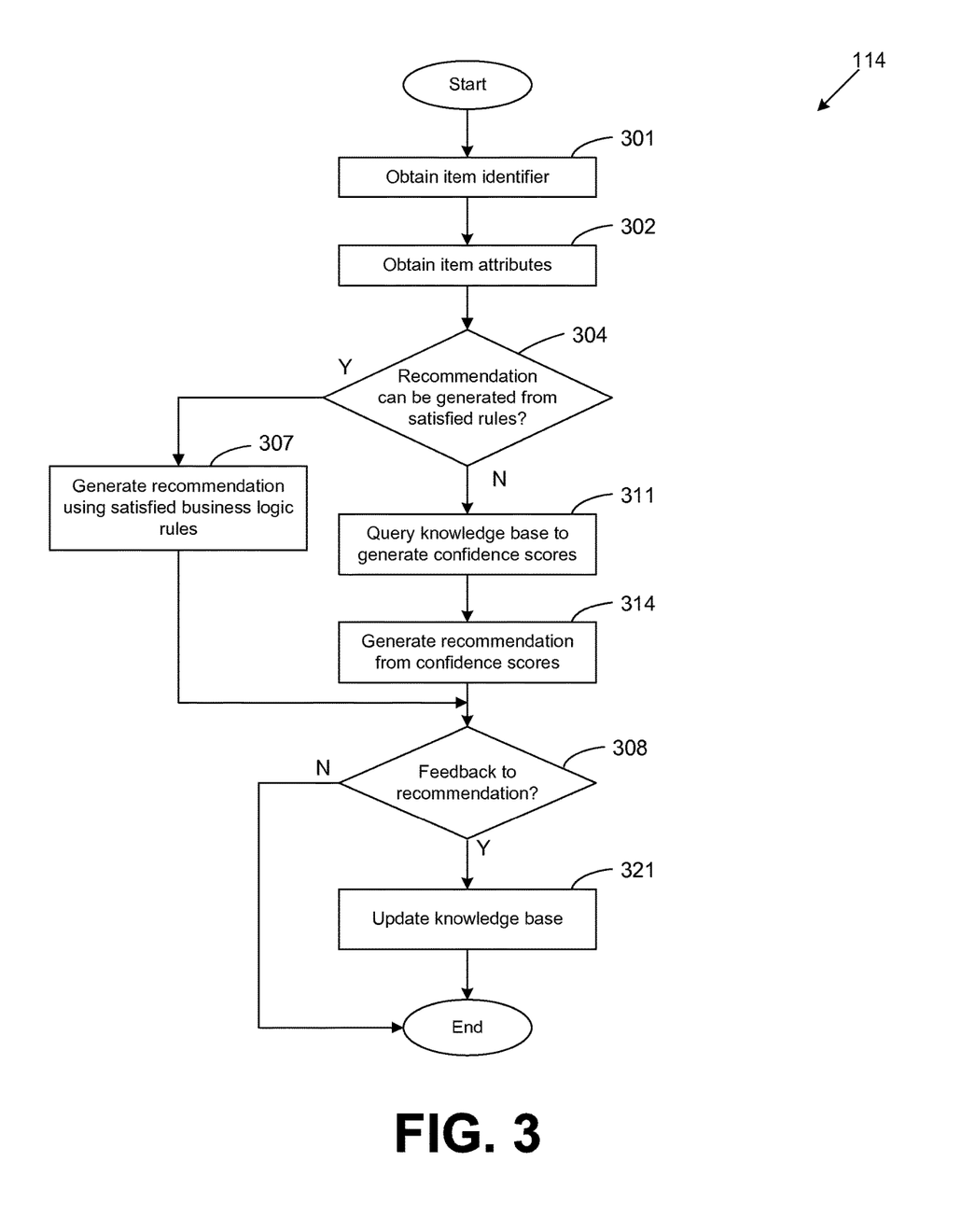
FIG. 3 is a flowchart illustrating one example of functionality implemented as portions of an item preparation application executed in a computing environment in the networked environment of FIG. 1, according to various embodiments of the present disclosure.

Referring next to FIG. 3, shown is a flowchart that provides one example of the operation of a portion of the item preparation application 114 according to various embodiments. It is understood that the flowchart of FIG. 3 provides merely an example of the many different types of functional arrangements that may be employed to implement the operation of the portion of the item preparation application 114 as described herein. As an alternative, the flowchart of FIG. 3 may be viewed as depicting an example of steps of a method implemented in the computing environment 101 (FIG. 1) according to one or more embodiments.

Beginning with box 301, the item preparation application 114 obtains an item identifier 130 (FIG. 1) from a client 104 (FIG. 1). The item identifier 130 may comprise, for example, a UPC, product identification, title, or other unique identifier of an item 124 (FIG. 1). The item identifier 130 may be manually input by a user of the client 104, obtained from a barcode, Quick Response (QR) code, or other visual embodiment of an item identifier 130, or generated by the client 104 by another approach.

Next, in box 302, the item preparation application 114 obtains attributes 131 (FIG. 1) corresponding to the item 124 indicated by the item identifier 130. Attributes 131 may be obtained from a catalog or other data accessible to an electronic commerce system 112 (FIG. 1). For example, if the item identifier 130 comprises a product identification in a catalog of products sold or distributed through the electronic commerce system 112, the item preparation application 114 may query a product page or other listing of the electronic commerce system 112 with the item identifier 130 to obtain the attributes 131. Attributes 131 may also be obtained from a data store 111 (FIG. 1), from the client 104, or by another approach.

After obtaining the item identifier 130 and attributes 131, the business logic module 117 (FIG. 1) of the item preparation application 114 determines in box 304 whether a recommendation 127 (FIG. 1) can be generated from satisfied business logic rules. This may comprise determining if the item 124 is included in a predefined list of items 124 having corresponding pregenerated recommendations 127. This may comprise, for example, comparing the item identifier 130 obtained from the client 104 to a list of item identifiers 130.

The business logic module 117 may also apply rules 128 (FIG. 1) to the attributes 131 of the item 124. In some embodiments, rules 128 may be applied to physical characteristics of the item 124 indicated in the attributes 131, such as a size, weight, or other physical characteristics. For example, very large items 124 such as those with a size meeting or exceeding a threshold may automatically require no packaging or preparation. Rules 128 may also be applied to materials or other components of an item 124 indicated in the attributes 131. For example, items 124 made of metal or paper may require no packaging, while items 124 made of glass may require padding or protective packaging. The business logic module 117 may then generate a recommendation 127 for the appropriate type of packaging.

The business logic module 117 may also apply rules 128 to attributes 131 obtained from a catalog or other data structure to facilitate the sale of items 124 through the electronic commerce system 112 or another system. For example, the business logic module 117 may automatically recommend packaging for items 124 meeting or exceeding a purchase price defined by the electronic commerce system 112. In embodiments in which items 124 are organized into a taxonomy or other classification system in the electronic commerce system 112, the business logic module 117 may apply rules 128 to categories, sub-categories, or other classifications including the item 124. For example, a rule 128 may indicate that an item 124 classified in the "Books" category may require no packaging. A rule 128 may also indicate that an item 124 classified in the "Plush Toys" category may always require plastic bagging or wrapping.

In some embodiments, the business logic module 117 may apply rules 128 to attributes 131 indicating supply chain or other business characteristics of the item 124. For example, a rule 128 may indicate that items 124 from a particular manufacturer always require packaging due to known quality or durability issues. As another example, a rule 128 may indicate that an item 124 normally requiring packaging is distributed from a vendor which prepackages items 124, and therefore requires no additional packaging. Rules 128 may also be applied to attributes 131 by other approaches.

The business logic module 117 may apply rules 128 to the item identifier 130, attributes 131, or other data sequentially or according to a priority of consideration. The rules 128 may be applied until a rule 128 is satisfied. The rules 128 may also be applied until a predefined number of rules 128 have been satisfied, or until a predefined number of rules 128 have been applied. The business logic module 117 may also apply the rules 128 in an order defined by a decision tree, randomly, or by some other approach.

If a recommendation 127 can be generated as a function of satisfied business logic rules, then the process advances to box 307 where the item preparation application 114 generates the recommendation 127 from the satisfied business logic rules. This may comprise, for example, loading a pregenerated recommendation 127 indexed by an item identifier 130. This may also comprise, for example, generating a recommendation 127 corresponding to an end node in a decision tree, or otherwise generating a recommendation 127 as a function of one or more satisfied business logic rules. The generated recommendation 127 may then be communicated to a client 104. After generating the recommendation 127, the process advances to box 308.

If no recommendation 127 can be generated as a function of satisfied business logic rules, in box 311, the machine learning module 121 (FIG. 1) of the item preparation application 114 queries the knowledge base 134 (FIG. 1) to generate one or more confidence scores corresponding to actions which may be indicated in a recommendation 127. The confidence score may indicate, for example, a probability that an item 124 requires any preparation, a probability that the item 124 requires a particular type of preparation, or another probability. In some embodiments, the queried knowledge base 134 may be a selected one of multiple knowledge bases 134. The knowledge base 134 may be selected as a function of attributes 131 such as an item 124 category or sub-category, as a function of client 104 input, or as a function of other data.

The machine learning module 121 may query the knowledge base 134 with the item identifier 130, attributes 131, or other data corresponding to an item 124. The machine learning module 121 may also query the knowledge base 134 with output from the business logic module 117, such as satisfied or unsatisfied rules. For example, if the attributes 131 or other data of an item 124 satisfy one or more rules, but the business logic module 117 was unable to generate a recommendation 127 from those satisfied rules, the business logic module 117 may then provide those satisfied rules 128 to the machine learning module 121 for input as a query to the knowledge base 134. Other data may also be used as input to query the knowledge base 134. The machine learning module 121 will then generate one or more confidence scores from the query to the knowledge base 134.

After generating the confidence scores, the machine learning module 121 will generate a recommendation 127 from the confidence scores in box 314. In some embodiments, this may comprise generating a recommendation 127 indicating an action corresponding to a confidence score responsive to the confidence score meeting or exceeding a predefined threshold. For example, the machine learning module 121 may generate a confidence score indicating a ninety-percent probability that an item 124 requires bagging. Responsive to the confidence score meeting or exceeding a threshold, the machine learning module 121 would then generate a recommendation 127 indicating that the item 124 should be bagged.

In embodiments in which the machine learning module 121 generates multiple confidence scores, the machine learning module 121 may generate a recommendation 127 indicating the action corresponding to the highest confidence score. In another embodiment, the machine learning module 121 may generate a recommendation 127 indicating the action corresponding to the highest confidence score which meets or exceeds a respective predefined threshold. For example, the machine learning module 121 may generate two confidence scores corresponding to two different recommendations 127. The recommendation 127 corresponding to the greatest confidence score may be selected, assuming that the greatest confidence score meets a minimum threshold.

In some embodiments, the machine learning module 121 may provide a default recommendation 127 responsive to none of the confidence scores meeting or exceeding a threshold. The default recommendation 127 may be a predefined default recommendation 127, defined as a function of user preferences, or by another approach. The machine learning module 121 may also generate recommendations 127 using confidence scores by another approach. The generated recommendation 127 may then be communicated to a client 104. After generating the recommendation 127, the process advances to box 308.

In box 308, the item preparation application 114 determines if there is feedback indicating a fault or defect in the generated recommendation 127. This may comprise, for example, determining if an item 124 corresponding to the generated recommendation 127 was returned as damaged or defective due to damage during storage. This may also comprise, for example, determining if a refund or complementary replacement for an item 124 is provided due to a customer complaint through the electronic commerce system 112. This may also comprise obtaining a manual override of a recommendation 127 from the client 104. Feedback may also be received for a recommendation 127 by another approach.

If no feedback is received for a recommendation 127, the process ends. Otherwise, the process advances to box 321, where the item preparation application 114 updates the knowledge base 134 to reflect the feedback. This may comprise, for example, modifying a knowledge base 134 entry corresponding to the generated recommendation 127 to reflect an action indicated in a manual override. This may also comprise modifying a weight, score, or other attribute of a knowledge base 134 entry corresponding to the generated recommendation 127. This may also comprise creating or deleting knowledge base 134 entries. The knowledge base 134 may also be updated by another approach. After updating the knowledge base 134, the process ends.

Figure 4:
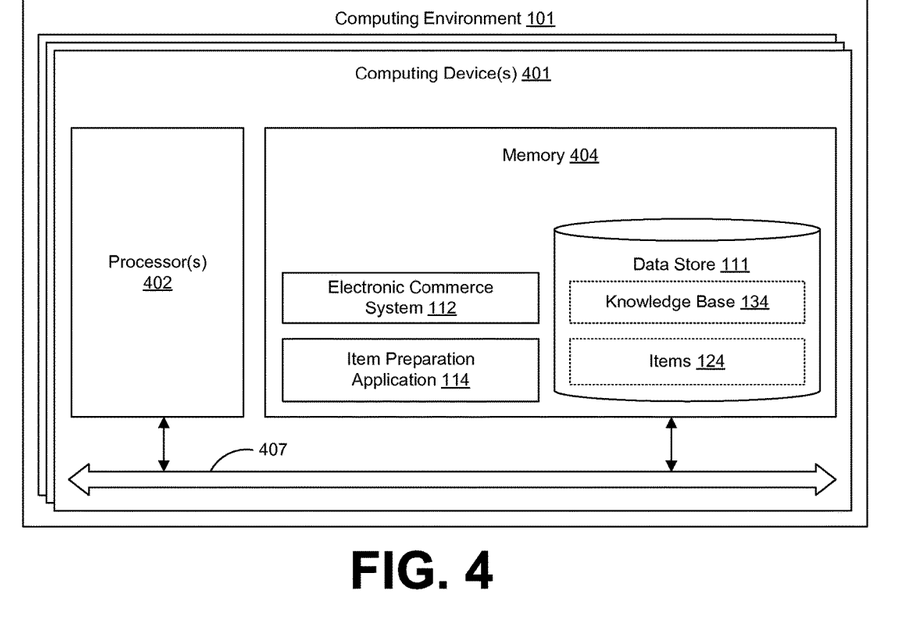
FIG. 4 is a schematic block diagram that provides one example illustration of a computing environment employed in the networked environment of FIG. 1, according to various embodiments of the present disclosure.

With reference to FIG. 4, shown is a schematic block diagram of the computing environment 101 according to an embodiment of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are an electronic commerce system 112, an item preparation application 114, and potentially other applications. Also stored in the memory 404 may be a data store 111 storing a knowledge base 134, items 124, and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc.

The local interface 407 may comprise additional systems designed to coordinate this communication, including, for example, performing load balancing. The processor 402 may be of electrical or of some other available construction.

Although the item preparation application 114 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the item preparation application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the item preparation application 114, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program having instructions that cause the at least one computing device to at least:
   obtain from a data store at least one attribute of an item to be stored in a physical storage facility prior to the item being picked for shipment;
   generate a recommendation as to whether to perform an item preparation on the item prior to a storage of the item in the physical storage facility, by:
      selecting a knowledge base as a function of the at least one attribute obtained from the data store, wherein the selected knowledge base comprises data indicating previously generated item preparation recommendations;
      querying the knowledge base for at least one previously generated item preparation recommendation that contains the at least one attribute;
      calculating a confidence score indicative of a probability that a particular item preparation action should be applied to the item as a function of the at least one attribute and the at least one previously generated item preparation recommendation from the knowledge base;
      comparing the confidence score to a plurality of predefined thresholds, each of the plurality of predefined thresholds corresponding to one of a plurality of item preparation actions; and
      including in the recommendation one of the plurality of item preparation actions as corresponding to one of the plurality of predefined thresholds met by the confidence score; and
   update the knowledge base based at least in part on at least one of: the recommendation, a customer return, a free replacement of the item, a customer review of the item, or a manual override of the recommendation.

2. The non-transitory computer-readable medium of claim 1, wherein the knowledge base is selected from a plurality of knowledge bases based at least in part on the at least one attribute.

3. The non-transitory computer-readable medium of claim 1, wherein generate the recommendation as to whether to perform the item preparation on the item prior to the storage of the item in the physical storage facility further comprises:
   determine that the item satisfies at least one business logic rule based at least in part on the at least one attribute; and
   provide, responsive to the item satisfying the at least one business logic rule, a predetermined recommendation associated with the at least one business logic rule.

4. The non-transitory computer-readable medium of claim 1, wherein the instructions further cause the at least one computing device to:
   obtain, from a client, the manual override of the recommendation.

5. A system, comprising:
   a data store; and
   at least one computing device configured to at least:
      generate a recommendation as to whether to perform an item preparation on an item prior to a storage of the item in a physical storage facility by:
         obtaining from the data store at least one attribute of the item to be stored in the physical storage facility prior to the item being picked for shipment, the item being stored in the physical storage facility prior to the item being picked for shipment;
         selecting a knowledge base as a function of the at least one attribute obtained from the data store, wherein the selected knowledge base comprises data indicating previously generated item preparation recommendations;
         applying machine learning to the knowledge base and the at least one attribute of the item to generate a confidence score indicative of a probability that a particular item preparation action should be applied to the item as a function of the at least one attribute and the at least one previously generated item preparation recommendation from the knowledge base;
         comparing the confidence score to a plurality of predefined thresholds, each of the plurality of predefined thresholds corresponding to one of a plurality of item preparation actions; and
         selecting one of the plurality of item preparation actions as corresponding to one of the plurality of predefined thresholds met by the confidence score; and
      wherein the recommendation comprises the selected one of the plurality of item preparation actions.

6. The system of claim 5, wherein the at least one computing device is further configured to update the knowledge base responsive to a customer return of the item or a free replacement of the item.

7. The system of claim 5, wherein the at least one computing device is further configured to update the knowledge base responsive to a customer review of the item.

8. The system of claim 5, wherein the at least one attribute comprises at least one of: a title of the item, an item category, a size of the item, or a vendor of the item.

9. The system of claim 5, wherein the at least one computing device is further configured to select the respective one of the plurality of predefined thresholds based at least in part on the at least one attribute.

10. The system of claim 5, wherein the plurality of item preparation actions comprise at least one of: initiating an inspection of the item or automatically initiating the item preparation.

11. The system of claim 5, wherein the at least one computing device is further configured to:
   obtain, from a client, a manual override of the recommendation; and
   modify the one of the plurality of predefined thresholds responsive to the manual override.

12. The system of claim 5, wherein generating generate the recommendation further comprises:
   determining whether the at least one attribute satisfies at least one rule; and
   providing, responsive to the at least one attribute satisfying the at least one rule, a predefined recommendation associated with the at least one rule.

13. The system of claim 5, wherein the knowledge base comprises at least one of a support vector machine, a Bayesian model, a regression model or a neural network.

14. A method, comprising:
   querying, in a computing device, a machine learning knowledge base with a plurality of attributes corresponding to an item for at least one previously generated item preparation recommendation that contains at least one of the plurality of attributes;
   determining, in the computing device, a confidence score indicative of a probability that a particular item preparation action should be applied to the item as a function of the plurality of attributes and the at least one previously generated item preparation recommendation from the machine learning knowledge base;
   generating, in the computing device, responsive to the querying, a recommendation as to whether the item requires preparation prior to being stored in a physical storage facility in anticipation of the item being picked for shipment, the recommendation indicating one of a plurality of item preparation actions corresponding to one of a plurality of predefined thresholds met by the confidence score, each of the plurality of predefined thresholds corresponding to one of the plurality of item preparation actions; and
   outputting, by the computing device, the recommendation to a client device.

15. The method of claim 14, further comprising updating, in the computing device, the machine learning knowledge base based at least in part on the recommendation.

16. The method of claim 14, further comprising updating, in the computing device, the machine learning knowledge base based at least in part on a manual override of the recommendation.

17. The method of claim 14, wherein the recommendation indicates a type of preparation to be applied to the item.

18. The method of claim 17, wherein the type of preparation comprises at least one of bagging the item, wrapping the item in an impact resistant material, or shrink-wrapping the item.

19. The method of claim 14, wherein the recommendation is a first recommendation, the machine learning knowledge base is a first machine learning knowledge base, and the method further comprises:
   querying, in the computing device, a second machine learning knowledge base with the plurality of attributes; and
   obtaining, in the computing device, responsive to the querying the second machine learning knowledge base, a second recommendation associated with a packaging of the item prior to a shipping of the item.

20. The method of claim 14, further comprising selecting the plurality of predefined thresholds based at least in part on the plurality of attributes.

* * * * *

UNITED STATES PATENT AND TRADEMARK OFFICE
CERTIFICATE OF CORRECTION

PATENT NO. : 9,552,553 B1  
APPLICATION NO. : 13/926565  
DATED : January 24, 2017  
INVENTOR(S) : Darren Edward Wilson et al.

It is certified that error appears in the above-identified patent and that said Letters Patent is hereby corrected as shown below:

In the Claims

At Column 17, Line 7, replace "generating generate" with --generate-- in Claim 12

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*